(12) United States Patent
Kawakubo et al.

(10) Patent No.: US 8,912,696 B2
(45) Date of Patent: Dec. 16, 2014

(54) MOTOR, ELECTRIC EQUIPMENT, AND METHOD OF MANUFACTURING MOTOR FOR REDUCING ELECTRIC COROSION OF BEARINGS

(75) Inventors: Mamoru Kawakubo, Tokyo (JP); Mineo Yamamoto, Tokyo (JP); Hiroyuki Ishii, Tokyo (JP); Hiroki Aso, Tokyo (JP); Tomoyuki Hasegawa, Tokyo (JP); Togo Yamazaki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 117 days.

(21) Appl. No.: 13/263,088

(22) PCT Filed: Apr. 22, 2009

(86) PCT No.: PCT/JP2009/057989
§ 371 (c)(1),
(2), (4) Date: Oct. 6, 2011

(87) PCT Pub. No.: WO2010/122642
PCT Pub. Date: Oct. 28, 2010

(65) Prior Publication Data
US 2012/0025746 A1    Feb. 2, 2012

(51) Int. Cl.
*H02K 5/10* (2006.01)
*H02K 11/00* (2006.01)
*H02K 21/38* (2006.01)
*H02K 13/14* (2006.01)
*H02K 5/173* (2006.01)

(52) U.S. Cl.
CPC ........ *H02K 11/0005* (2013.01); *H02K 11/0073* (2013.01); *H02K 5/1732* (2013.01); *H02K 2211/03* (2013.01)
USPC ........... 310/85; 310/71; 310/154.44; 310/225

(58) Field of Classification Search
CPC ................................. H02K 21/24; H02K 3/26
USPC .................. 310/71, 85, 154.44, 225
See application file for complete search history.

(56) References Cited

U.S. PATENT DOCUMENTS 4,604,665 A * 8/1986 Muller et al. .............. 360/99.23
4,647,803 A * 3/1987 von der Heide et al. ........ 310/51
(Continued)

FOREIGN PATENT DOCUMENTS

CN      200987114 Y    12/2007
DE       3427994 A1     1/1986
(Continued)

OTHER PUBLICATIONS

Machine Translation JP10051995 (1998), JP2002136056 (2002), JP07059285 (1995).*
(Continued)

*Primary Examiner* — Tran Nguyen
*Assistant Examiner* — Jose Gonzalez Quinones
(74) *Attorney, Agent, or Firm* — Buchanan Ingersoll & Rooney PC

(57) ABSTRACT

In a motor driven by a drive circuit such as an inverter, there is a problem that electric current flowing through a bearing causes electric corrosion, which impairs the durability of the bearing. A motor of the invention includes: a stator in which a winding is applied through an insulating part to a stator core formed by laminating a predetermined number of electromagnetic steel plates which have been punched into a predetermined shape; a rotor assembly in which a rotor and bearings and formed by rolling bearings are fitted to a shaft; a printed wiring board which is arranged at an end part of the stator in an axial direction and to which a drive circuit is mounted; a bracket imposed to at least the end part of the stator in the axial direction to which the printed wiring board is arranged; and a conductive sheet provided between the printed wiring board and the bracket.

11 Claims, 9 Drawing Sheets

(56) References Cited

U.S. PATENT DOCUMENTS

| | | | |
|---|---|---|---|
| 2002/0053843 A1 | 5/2002 | Sunaga et al. | |
| 2006/0049785 A1* | 3/2006 | Tzeng et al. | 318/254 |
| 2006/0186746 A1 | 8/2006 | Nanbu et al. | |
| 2008/0042499 A1 | 2/2008 | Okada | |
| 2010/0253158 A1 | 10/2010 | Mizukami et al. | |
| 2010/0320880 A1 | 12/2010 | Kamogi | |

FOREIGN PATENT DOCUMENTS

| | | | | |
|---|---|---|---|---|
| DE | 199 18 084 A1 | | 11/2000 | |
| EP | 1 130 745 A2 | | 9/2001 | |
| FR | 2 777 135 A1 | | 10/1999 | |
| JP | 59-170523 A | | 9/1984 | |
| JP | 62-138036 A | | 6/1987 | |
| JP | 07059285 A | * | 3/1995 | |
| JP | 10051995 A | * | 2/1998 | |
| JP | 2000032729 A | * | 1/2000 | |
| JP | 2000-156952 A | | 6/2000 | |
| JP | 2002136056 A | * | 5/2002 | |
| JP | 2004-242413 A | | 8/2004 | |
| JP | 2007-020348 A | | 1/2007 | |
| JP | 2007-089338 A | | 4/2007 | |
| JP | 2007-116839 A | | 5/2007 | |
| JP | 2007-159302 A | | 6/2007 | |
| JP | 2007159302 A | * | 6/2007 | |
| JP | 2008125315 A | * | 5/2008 | |
| JP | 2008-526175 A | | 7/2008 | |
| WO | 2008/111242 A1 | | 9/2008 | |
| WO | WO 2009/001546 A1 | | 12/2008 | |

OTHER PUBLICATIONS

Machine Translation JP2007159302 (2007).*
The Extended European Search Report dated Aug. 1, 2012, issued in corresponding European Patent Application No. 09843642.1. (11 pages).
International Search Report (PCT/ISA/210) issued on Jun. 2, 2009, by Japanese Patent Office as the International Searching Authority for International Application No. PCT/JP2009/057989.
Examination Report dated Oct. 12, 2012, issued in corresponding New Zealand Patent Application No. 595915 (2 pages).
Office Action from Chinese Patent Office dated Apr. 3, 2013, issued in corresponding Chinese Patent Application No. 200980158844.6, with a partial English translation thereof. (14 pages).
Office Action from Australian Patent Office (IP Australia) dated Apr. 10, 2013, issued in corresponding Australian Patent Application No. 2009345022. (4 pages).
Office Action from Chinese Patent Office dated Oct. 21, 2013, issued in corresponding Chinese Patent Application No. 200980158844.6, with English translation thereof. (21 pages).
Office Action from Chinese Patent Office dated Apr. 8, 2014, issued in corresponding Chinese Patent Application No. 200980158844.6, and English translation thereof. (18 pages).

* cited by examiner

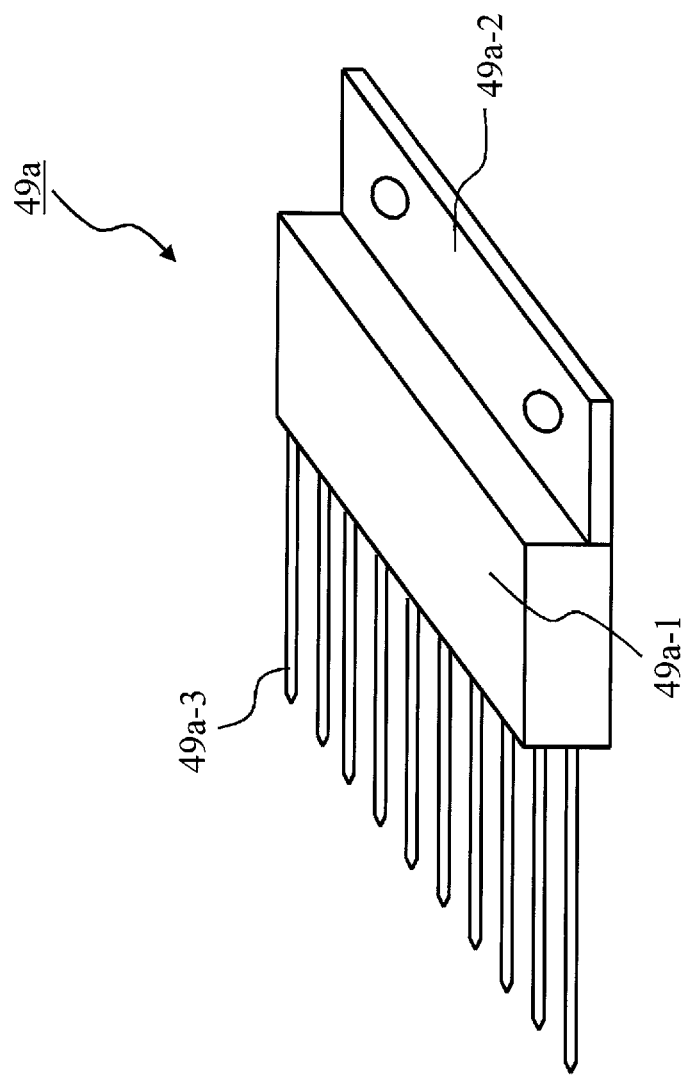

Fig. 8

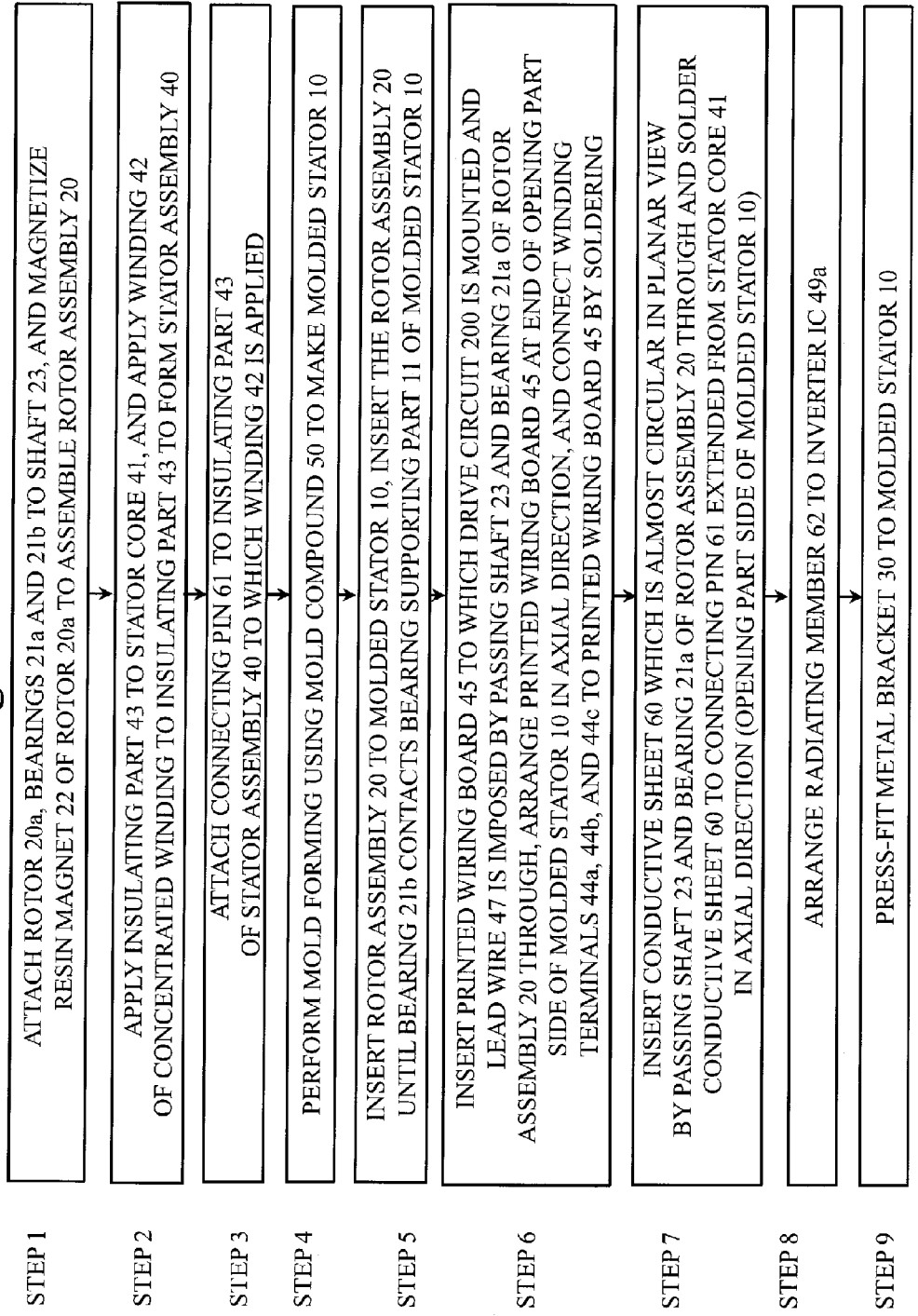

STEP 1 — ATTACH ROTOR 20a, BEARINGS 21a AND 21b TO SHAFT 23, AND MAGNETIZE RESIN MAGNET 22 OF ROTOR 20a TO ASSEMBLE ROTOR ASSEMBLY 20

STEP 2 — APPLY INSULATING PART 43 TO STATOR CORE 41, AND APPLY WINDING 42 OF CONCENTRATED WINDING TO INSULATING PART 43 TO FORM STATOR ASSEMBLY 40

STEP 3 — ATTACH CONNECTING PIN 61 TO INSULATING PART 43 OF STATOR ASSEMBLY 40 TO WHICH WINDING 42 IS APPLIED

STEP 4 — PERFORM MOLD FORMING USING MOLD COMPOUND 50 TO MAKE MOLDED STATOR 10

STEP 5 — INSERT ROTOR ASSEMBLY 20 TO MOLDED STATOR 10, INSERT THE ROTOR ASSEMBLY 20 UNTIL BEARING 21b CONTACTS BEARING SUPPORTING PART 11 OF MOLDED STATOR 10

STEP 6 — INSERT PRINTED WIRING BOARD 45 TO WHICH DRIVE CIRCUIT 200 IS MOUNTED AND LEAD WIRE 47 IS IMPOSED BY PASSING SHAFT 23 AND BEARING 21a OF ROTOR ASSEMBLY 20 THROUGH, ARRANGE PRINTED WIRING BOARD 45 AT END OF OPENING PART SIDE OF MOLDED STATOR 10 IN AXIAL DIRECTION, AND CONNECT WINDING TERMINALS 44a, 44b, AND 44c TO PRINTED WIRING BOARD 45 BY SOLDERING

STEP 7 — INSERT CONDUCTIVE SHEET 60 WHICH IS ALMOST CIRCULAR IN PLANAR VIEW BY PASSING SHAFT 23 AND BEARING 21a OF ROTOR ASSEMBLY 20 THROUGH AND SOLDER CONDUCTIVE SHEET 60 TO CONNECTING PIN 61 EXTENDED FROM STATOR CORE 41 IN AXIAL DIRECTION (OPENING PART SIDE OF MOLDED STATOR 10)

STEP 8 — ARRANGE RADIATING MEMBER 62 TO INVERTER IC 49a

STEP 9 — PRESS-FIT METAL BRACKET 30 TO MOLDED STATOR 10

MOTOR, ELECTRIC EQUIPMENT, AND METHOD OF MANUFACTURING MOTOR FOR REDUCING ELECTRIC COROSION OF BEARINGS

TECHNICAL FIELD

The present invention relates to a motor mounting a printed wiring board having a drive circuit, using a rolling bearing, and driven by an inverter. Further, the present invention also relates to a method of manufacturing the motor and electric equipment such as an air conditioner, etc. mounting the motor.

BACKGROUND ART

Conventionally, when driving a motor using an inverter, in order to reduce noise of the motor generated with switching of a transistor, carrier frequency of the inverter is set high. When the carrier frequency is set high or a source voltage is high, a potential difference between an inner ring and an outer ring of a rolling bearing which supports a shaft becomes large, and thus electric current easily flows into the rolling bearing. There is a problem that the electric current flowing through the rolling bearing generates corrosion so-called electric corrosion on rolling surfaces of both races of the inner ring and the outer ring and a rolling element (balls or rollers rolling between the inner and outer rings), thereby degrading the durability of the rolling bearing. Further, there is another problem that large noise may occur from the motor due to the generation of the electric corrosion. Various kinds of motors which solve the above problems have been proposed.

For instance, a motor has been proposed, which is structured by a stator core; a stator molded to form one body with a stator winding wound to the stator core using insulating resin; a rotor having a shaft; a first bearing and a second bearing for supporting the shaft; a metal bracket coupled to the stator and retaining at least either of the first bearing and the second bearing; and a conductive member for short-circuiting the stator core and the metal bracket (for instance, refer to Patent Literature 1).

Further, another motor has been proposed, in which a bracket of an output side and a bracket of the opposite side to the output side attached to a frame is short-circuited by a conductive tape, and the conductive tape is bonded to the outside of the frame (for instance, refer to Patent Literature 2).

CITATION LIST

Patent Literature

[Patent Literature 1] JP2008-526175A
[Patent Literature 2] JP2007-020348A

SUMMARY OF INVENTION

Technical Problems

However, in a motor of the Patent Literature 1, a drive circuit and a metal bracket are closely arranged; there is a problem that electric current flows from the drive circuit to a bearing side through the metal bracket and a conductive member side which short-circuits a stator core and the metal bracket, thereby causing electric corrosion at the bearing.

Further, in a motor of the Patent Literature 2, a bracket of an output side and a bracket of the opposite side to the output side attached to a frame are short-circuited by a conductive tape, and the conductive tape is bonded to the outside of the frame; there is a problem that when electric potential is generated in a rotor, electric current flows through a bearing, thereby causing electric corrosion.

In order to solve the above problems, the present invention aims to provide a motor, a method of manufacturing the motor, and an electric equipment that can reduce electric current flowing through a bearing which causes abnormal abrasion of the bearing and suppress electric corrosion of the bearing without degrading the productivity or the quality.

Solution to Problem

According to the present invention, a motor includes:
a stator in which a winding is applied through an insulating part to a stator core formed by laminating a predetermined number of electromagnetic steel plates which have been punched into a predetermined shape;
a rotor assembly in which a rotor and a bearing formed by a rolling bearing is fitted to a shaft;
a printed wiring board which is arranged at an end part of the stator in an axial direction and to which a drive circuit is mounted;
a bracket imposed to at least the end part of the stator in the axial direction to which the printed wiring board is arranged; and
a conductive sheet provided between the printed wiring board and the bracket.

The motor of the invention is characterized in that the conductive sheet and the stator core are electrically connected.

The motor of the invention is characterized in that the conductive sheet and the stator core are electrically connected using a connecting pin which is conductive.

The motor of the invention is characterized in that the connecting pin is fixed to the insulating part.

The motor of the invention is characterized in that the printed wiring board is provided with a through-hole for passing the connecting pin through.

The motor of the invention is characterized in that a flexible wiring board having at least a conductive layer and an insulating layer is used for the conductive sheet.

The motor of the invention is characterized in that the conductive sheet is provided with a through-hole for passing a component mounted on the printed wiring board through.

The motor of the invention is characterized in that the conductive sheet has an almost same area as the printed wiring board.

The motor of the invention is characterized in that the drive circuit includes at least:
a position detecting circuit for detecting a magnetic pole of the rotor;
a waveform generating circuit for generating a PWM (Pulse Width Modulation) signal to drive an inverter based on a speed instructing signal to instruct a rotating speed of the rotor and a position detecting signal from the position detecting circuit;
a pre-driver circuit for generating a driving signal by an output of the waveform generating circuit; and
a power circuit having an arm for connecting respective transistors and respective diodes in parallel and further connecting them in series.

An electric equipment of the present invention is characterized in that the above motor is mounted.

According to the present invention, a method of manufacturing a motor is the method of manufacturing the above motor, and the method includes steps of:

attaching the rotor and the bearing to the shaft, and magnetizing a magnet of the rotor to form the rotor assembly;

applying the insulating part to the stator core, applying the winding to the insulating part to form a stator assembly, attaching a connecting pin to the insulating part of the stator assembly to form the stator;

inserting the rotor assembly to the stator;

arranging the printed wiring board to which the drive circuit is mounted at the end part of the stator in the axial direction, and connecting a winding terminal and the printed wiring board by soldering;

arranging the conductive sheet outside the printed wiring board in the axial direction; and press-fitting the bracket to the end part of the stator in the axial direction.

Advantageous Effects of Invention

The motor related to the present invention is provided with the metal bracket and the conductive sheet arranged between the printed wiring board and the bracket, and thus it is possible to obtain effect to reduce electric current flowing through the bearing and prevent abnormal sound due to abnormal abrasion.

BRIEF DESCRIPTION OF DRAWINGS

FIG. 7 shows the first embodiment, which is a perspective view of an outer appearance of an inverter IC 49a.

FIG. 8 shows the first embodiment, which is a diagram of a manufacturing process of the motor 100.

DESCRIPTION OF EMBODIMENTS

Embodiment 1

Figure 1:
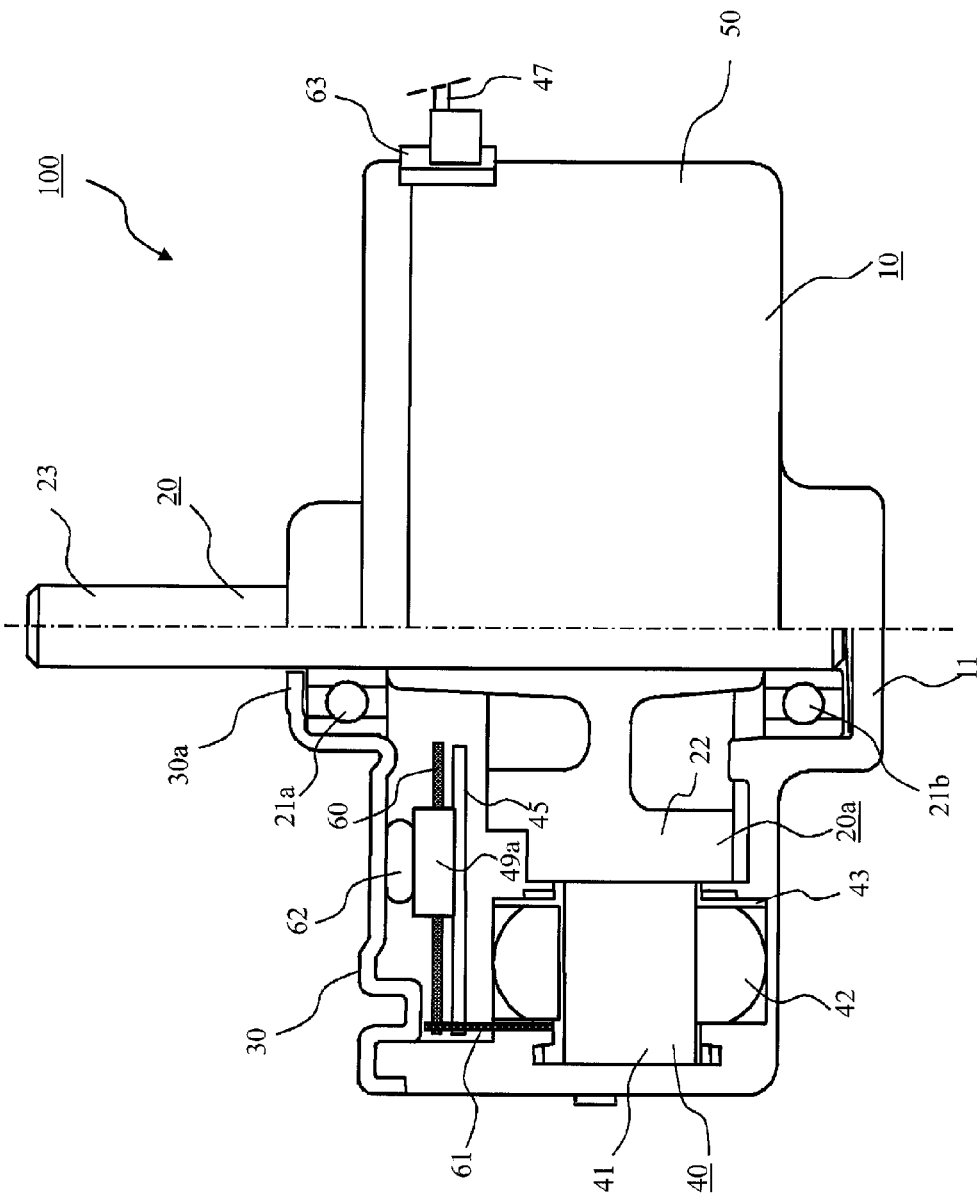
FIG. 1 shows the first embodiment, which is a cross section view of a motor 100.
Figure 2:
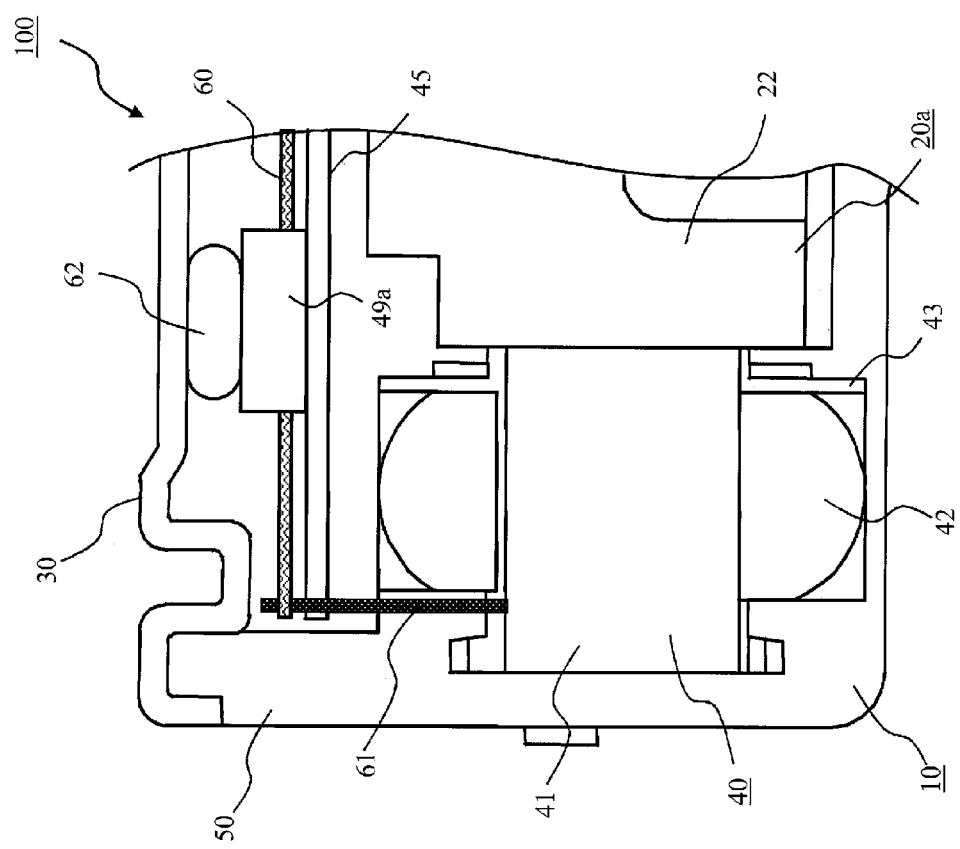
FIG. 2 shows the first embodiment, which is a partial enlarged cross section view of a surrounding part of a connecting pin 61.
Figure 3:
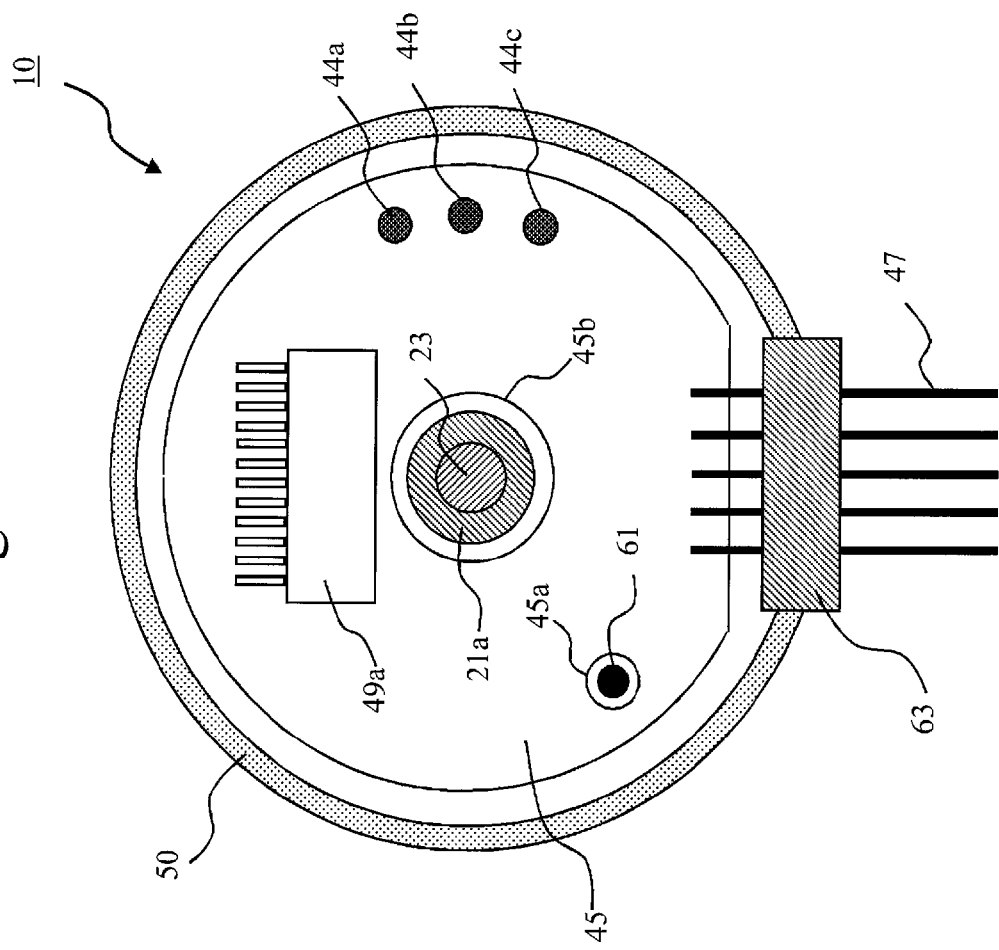
FIG. 3 shows the first embodiment, which is a plan view showing status in which after inserting a rotor assembly 20 to a molded stator 10, a printed wiring board 45 is mounted.
Figure 4:
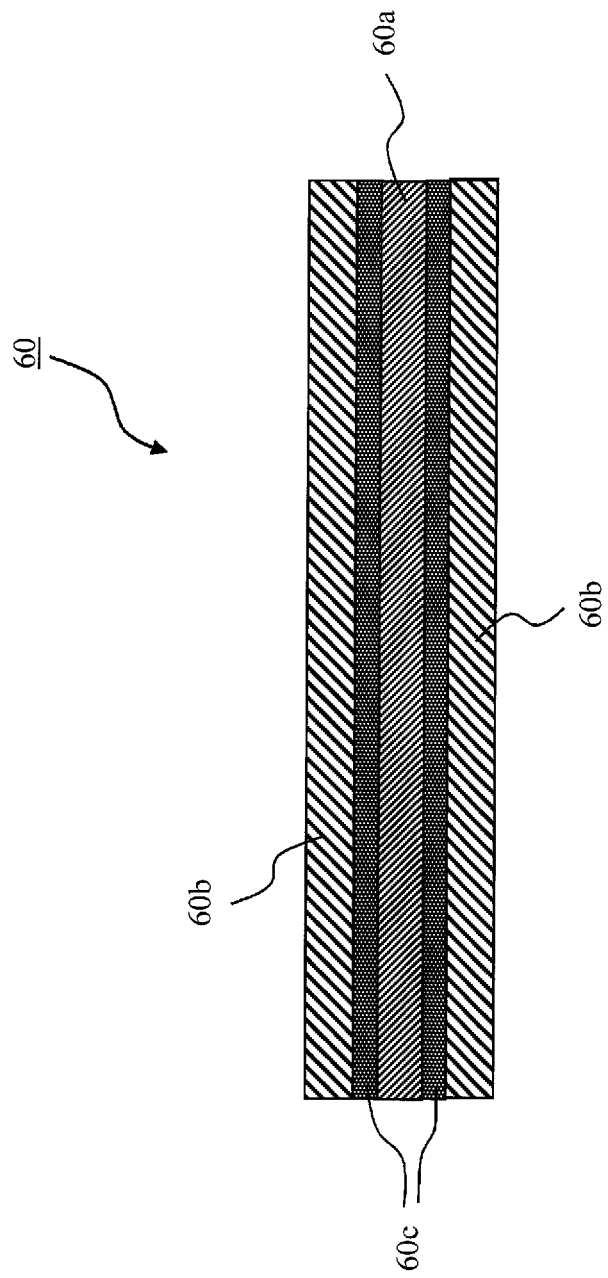
FIG. 4 shows the first embodiment, which is a cross section view of a conductive sheet 60.
Figure 5:
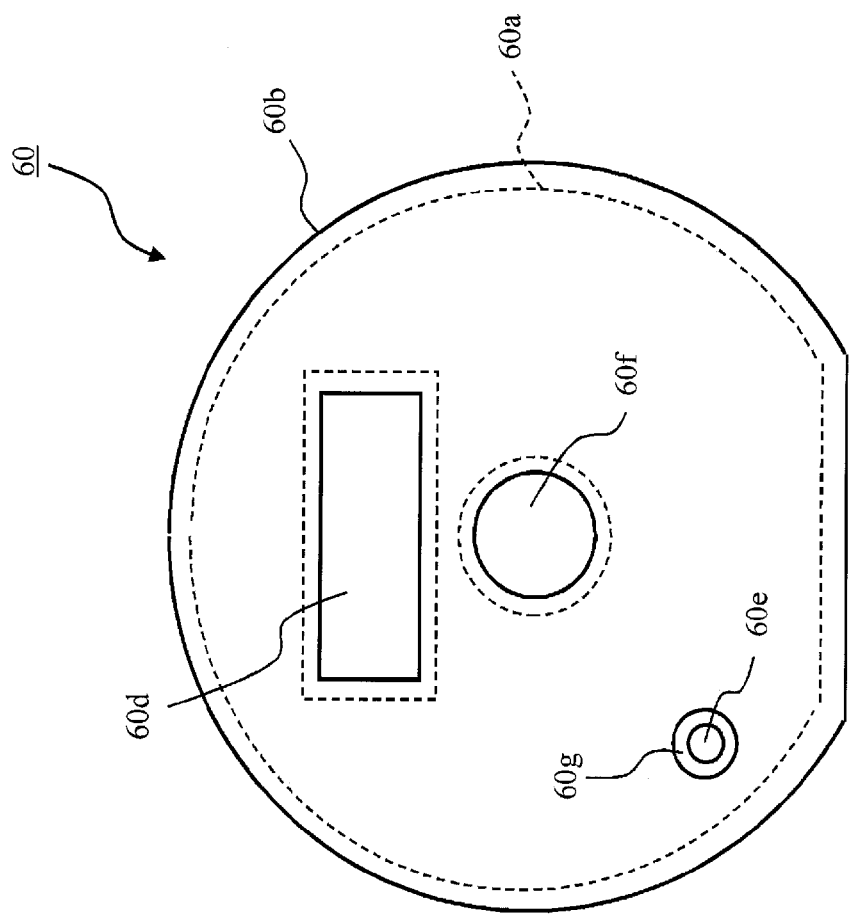
FIG. 5 shows the first embodiment, which is a plan view of the conductive sheet 60.
Figure 6:
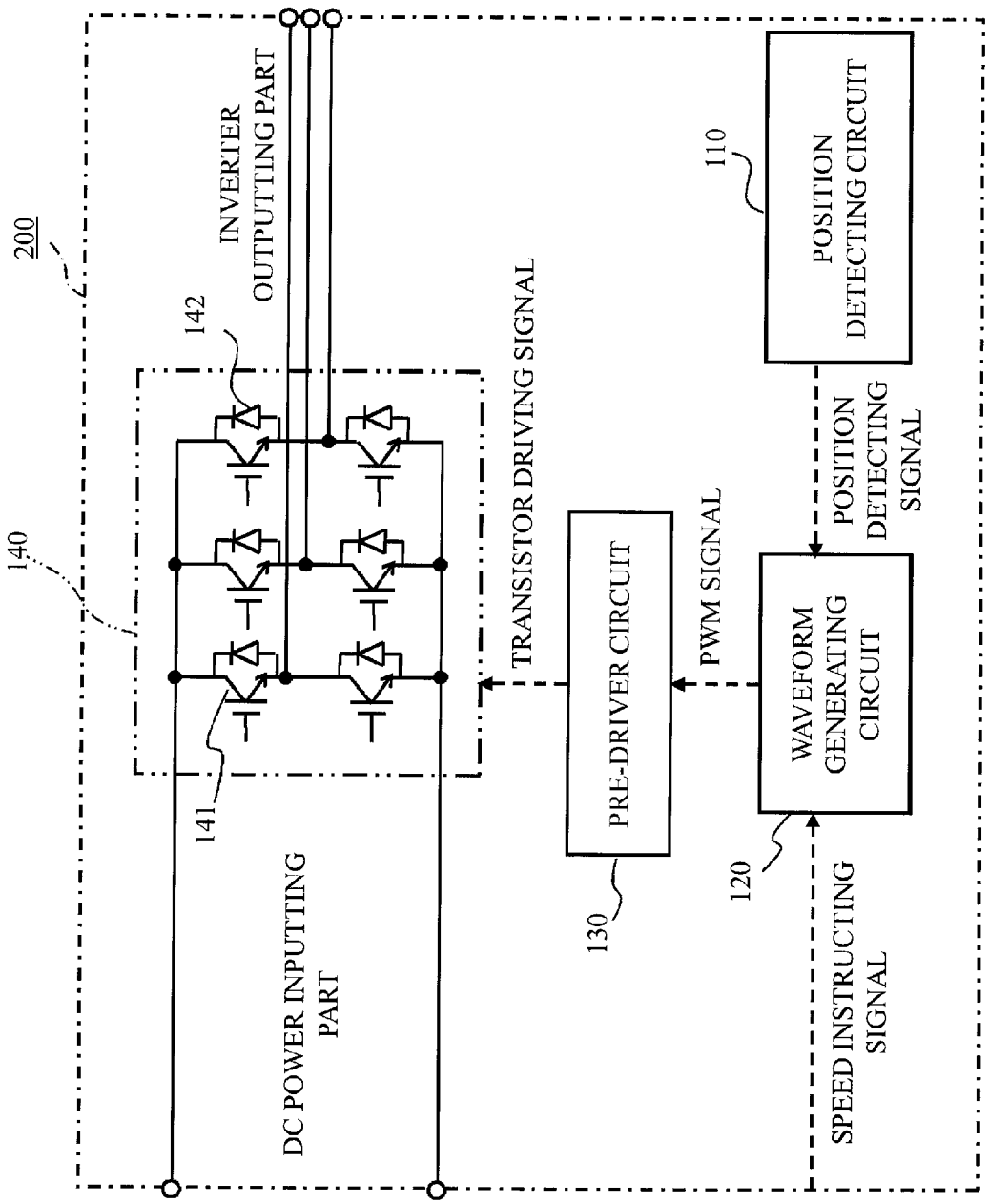
FIG. 6 shows the first embodiment, which is a block diagram of a drive circuit 200 for driving the motor 100.

FIGS. 1 to 8 show the first embodiment; FIG. 1 is a cross section view of a motor 100; FIG. 2 is a partial enlarged cross section view of a surrounding part of a connecting pin 61; FIG. 3 is a plan view showing status in which after inserting a rotor assembly 20 to a molded stator 10, a printed wiring board 45 is attached; FIG. 4 is a cross section view of a conductive sheet 60; FIG. 5 is a plan view of the conductive sheet 60; FIG. 6 is a block diagram of a drive circuit 200 for driving the motor 100; FIG. 7 is a perspective view of an outer appearance of an inverter IC 49a; and FIG. 8 is a diagram of a manufacturing process of the motor 100.

A structure of the motor 100 will be explained with reference to FIG. 1; first, an assembling procedure of the motor 100 will be discussed before explaining the structure of motor 100.

First, an insulating part 43 is applied to teeth of a stator core 41, and a winding 42 of a concentrated winding system is wound, forming a stator assembly 40.

Next, mold forming of the stator assembly 40 to which the winding 42 has been finished is done using mold compound 50, thereby forming a molded stator 10 (an example of a stator). For the mold compound 50, for instance, thermosetting resin such as unsaturated polyester resin is used.

The molded stator 10 has an opening at one end in the axial direction. The other end of the molded stator 10 in the axial direction may be closed, or may be provided with a hole which is large enough to insert the shaft 23. By opening the hole, it is possible to increase the flexibility to decide the position for providing load, for instance, a fan, etc.

The rotor assembly 20 is inserted to the molded stator 10 from the opening part. The rotor assembly 20 includes at least a rotor 20a, bearings 21a and 21b (rolling bearings), and a shaft 23.

The rotor assembly 20 inserted from the one end part of the molded stator 10 in the axial direction is compressed until the bearing 21b (the rolling bearing, generally press-fitted to the shaft 23) is contacted to the bearing supporting part 11 provided at the end part of the opposite side of the opening part of the molded stator 10 in the axial direction, and supported by the bearing supporting part 11 provided at the end part of the opposite side of the opening part of the molded stator 10 in the axial direction. The bearing supporting part 11 is formed by the mold compound 50.

A printed wiring board 45 to which a drive circuit 200 (refer to FIG. 6) such as an inverter is mounted and a lead wire 47 is imposed is inserted by passing the shaft 23 and the bearing 21a of the rotor assembly 20 through, the printed wiring board 45 is arranged at the end part of the opening part of the molded stator 10 in the axial direction, and winding terminals 44a, 44b, and 44c (refer to FIG. 3) are connected to the printed wiring board 45 by soldering.

The conductive sheet 60 which is almost circular in planar view is inserted by passing the shaft 23 and the bearing 21a of the rotor assembly 20 through, and is soldered to the connecting pin 61 which extends from the stator core 41 in the axial direction (the opening part side of the molded stator 10). The conductive sheet 60 is placed outside the printed wiring board 45 in the axial direction. The connecting pin 61 is formed by a conductor.

Finally, the metal bracket 30 for supporting the bearing 21a is press-fitted to the side end of opening part of the molded stator 10, and the opening part of the molded stator 10 is sealed, completing the motor 100. The bracket 30 supports the bearing 21a mounted to the rotor assembly 20 using the bearing supporting part 30a.

The motor 100 shown in FIG. 1 includes at least the molded stator 10, the rotor assembly 20, the printed wiring board 45, the conductive sheet 60, and the bracket 30 made of metal mounted to one end part of the molded stator 10 in the axial direction. The motor 100 includes a permanent magnet in, for instance, the rotor 20a, and is a brushless DC motor driven by the inverter.

The stator assembly 40 has the following structure.

(1) Electromagnetic steel plates having the thickness of around 0.1 to 0.7 mm are punched into strips, laminated by caulking, welding, adhering, etc. to produce a strip-shaped stator core 41. The strip-shaped stator core 41 includes a plurality of teeth (not shown). The teeth are located at the inside of a portion to which the winding 42 of concentrated winding that will be discussed later is applied.

(2) The insulating part 43 is applied to the teeth. The insulating part 43 is formed as one body or separately with the stator core 41 using, for instance, thermoplastic resin such as PBT (polybutylene terephthalate).

(3) To the teeth to which the insulating part 43 is applied, the winding 42 of concentrated winding is wound. A plurality of windings of concentrated winding is connected to form a winding of three-phase single Y-connection. However, distributed winding can be used instead.

(4) Since it is a three-phase single Y-connection, the connection side of the insulating part 43 (in the molded stator 10, the opening part side) is provided with winding terminals 44a, 44b, and 44c (refer to FIG. 3), to which windings of respective phase (U-phase, V-phase, and W-phase) are connected.

The molded stator 10 is formed by molding with mold compound 50 the stator assembly 40 in which winding 42 is finished. For the mold compound 50, for instance, thermosetting resin such as unsaturated polyester resin is used.

The rotor assembly 20 includes at least the rotor 20a, the bearings 21a and 21b (the rolling bearings), and the shaft 23.

The rotor 20a is a ring-shaped magnet formed by mixing magnetic material to thermoplastic resin using a resin magnet 22. However, it is not limited to use the resin magnet 22; sintered magnet may be used instead. The magnet can be ferrite or rare earthes (neodymium, samarium-cobalt, etc.).

The bearings 21a and 21b are the rolling bearings, which include an inner ring press-fitted to the shaft 23, an outer ring supported by the bearing supporting part, and a rolling element which rolls between the inner ring and the outer ring.

The bearings 21a and 21b are arranged at both sides of the rotor 20a, and press-fitted to the shaft 23.

To the bearing supporting part 11 at the opposite side of the opening part of the molded stator 10, the outer ring of the bearing 21b is supported.

The outer ring of the bearing 21a is supported by the bearing supporting part 30a of the bracket 30.

In the printed wiring board 45 to which the drive circuit 200 is mounted, a lead wire 47 is imposed to the mold compound 50 through a lead wire fixing component 63. A part of the side end of opening part of the molded stator 10 is notched (not shown). To this notched part, the lead wire fixing component 63 is imposed.

The printed wiring board 45 is mounted to the printed wiring board mounting surface of the side end of opening part of the molded stator 10, thereby determining the position in the axial direction. Parts of the winding terminals 44a, 44b, and 44c, which are projected from the printed wiring board 45 in the axial direction, of the stator assembly 40 are soldered, thereby electrically connected (refer to FIG. 3).

To the printed wiring board 45, an inverter IC 49a for driving the motor 100 (for instance, a brushless DC motor) and a hall IC (position sensitive device, not shown) for detecting the position of magnetic pole of the rotor 20a, etc. are mounted.

The conductive sheet 60 will be discussed later.

FIG. 2 shows the first embodiment, which is a partial enlarged cross section view of the surrounding part of the connecting pin 61. With reference to FIG. 2, a structure of the surrounding part of the connecting pin 61 will be explained. The connecting pin 61 is assembled to the insulating part 43 (the connection side) of the stator assembly 40, thereby electrically connecting to the stator core 41.

The connecting pin 61 passes through the first through-hole 45a (an example of a through-hole, refer to FIG. 3) of the printed wiring board 45, and connected to the conductive layer 60a (refer to FIG. 4) of the conductive sheet 60 using soldering, etc., and thereby the stator core 41 and the conductive sheet 60 are electrically connected.

Here, the connecting pin 61 is placed away from the conductive part such as wirings and electronic components on the printed wiring board 45 with the insulating distance which is required for securing the safeness.

The conductive sheet 60 is arranged in a manner that the inverter IC 49a is contained in the first through-hole 60d (an example of the through-hole, refer to FIG. 5).

Since the radiation member 62 such as silicon, etc. having a good heat conductivity is arranged between the inverter IC 49a and the bracket 30, the heat of the inverter IC 49a is released through the radiation member 62, etc. It is needless to say arranging the radiation member 62 having a good heat conductivity so as to contact with the radiation fin (discussed later) of the inverter IC 49a causes to have a good heat radiation property.

The bracket 30, the conductive sheet 60, and the drive circuit 200 of the inverter IC 49a, etc. are respectively insulated. The conductive sheet 60 and the printed wiring board 45 are made to have almost circular shapes having almost the same sizes (area).

The conductive sheet 60 is provided with the first through-hole 60d for the inverter IC 49a; a through-hole may be provided at the conductive sheet 60 in the same manner when another component which is high in the vertical direction is mounted to the printed wiring board 45.

Here, a straight-shaped connecting pin 61 is shown; it is also possible to fix the position by providing an uneven part at the attaching position of the connecting pin 61 of the conductive sheet 60.

When the conductive sheet 60 is not used, the electric current flowing through the bearing 21a is extremely large compared with the electric current flowing through the bearing 21b; the electric current flows much in the route of the drive circuit 200 of the printed wiring board 45, the metal bracket 30, the bearing 21a, the shaft 23, the stator core 41, the winding 42, and the drive circuit 200.

The conductive sheet 60 electrically connected to the stator core 41 is inserted between the drive circuit 200 and the bracket 30, and thus the electric current flowing through the bearing 21a flows much in the route of the drive circuit 200, the conductive sheet 60, the stator core 41, the winding 42, and the drive circuit 200, and the electric current flowing through the bearing 21a which causes the electric corrosion is largely reduced.

According to the experiment, for instance, it is possible to reduce the electric current of some hundreds mA to around 15% of the initial value by inserting the conductive sheet 60. Further, it is possible to reduce the electric current to around 3% of the initial value by electrically connecting the conductive sheet 60 to the stator core 41.

The drive circuit 200 and the winding 42 are connected; since between the drive circuit 200 and the bracket 30, between the outer ring and the inner ring of the bearing 21a, between the shaft 23 and the stator core 41, and between the stator core 41 and the winding 42, connection is done by floating capacitance, the electric current flows through the floating capacitance by driving the inverter. The electric current increases as the carrier frequency is set high, and further, a DC source inputting part, which will be discussed later, is set high. The drive circuit 200 here is the component or circuit wiring (not shown) mounted on the printed wiring board 45.

FIG. 3 shows the first embodiment, which is a plan view showing status in which after inserting the rotor assembly 20 to the molded stator 10, the printed wiring board 45 is mounted. The side end of opening part of the molded stator 10 is provided with the printed wiring board 45 to which the drive circuit 200 is mounted.

The winding terminals 44a, 44b, and 44c, to each of which the winding 42 is connected, are soldered by a land part (not shown) provided at the printed wiring board 45.

The connecting pin 61 passes through the first through-hole 45a provided at the printed wiring board 45. The first through-hole 45a is formed to have the essential minimal area for passing the connecting pin 61 through.

Here, an example is shown in which the printed wiring board 45 is provided with the first through-hole 45a; it is also possible to provide the outer circumferential part of the printed wiring board 45 with a notch, etc., thereby arranging the connecting pin 61 at the outer side of the notch.

At the almost center part of the printed wiring board 45, the second through-hole 45b having the inner diameter being larger than the outer diameter of the bearing 21a is provided. By providing the second through-hole 45b, after inserting the rotor assembly 20 to the molded stator 10, the printed wiring board 45 can be mounted to the molded stator 10 by passing the bearing 21a through.

FIG. 4 shows the first embodiment, which is a cross section view of the conductive sheet 60. For the conductive sheet 60, generally-used flexible wiring board is used. Both sides of the conductive layer 60a are provided with the insulating layers 60b through the bonding layers 60c. For the conductive layer 60a, e.g., copper is used. For the insulating layers 60b, e.g., polyimide is used.

FIG. 5 shows the first embodiment, which is a plan view of the conductive sheet 60. The conductive sheet 60 is provided with the first through-hole 60d for passing the inverter IC 49a through, the second through-hole 60e for passing the connecting pin 61 through, and the third through-hole 60f for passing the shaft 23 and the bearing 21a through.

Since the conductive layer 60a is covered by the insulating layers 60b at the outer circumferential part, the first through-hole 60d, and the third through-hole 60f, the conductive layer 60a is certainly insulated from the conductive part of the printed wiring board 45 or the mounted components. The second through-hole 60e is provided with a soldering part 60g (land) which is solderable and is exposed from the insulating layers 60b.

The thickness of the conductive layer 60a is around some tens of μm. It is sufficient that each of the insulating layers 60b has the thickness of around some tens of μm to some hundreds of μm in order to secure the voltage resistance (electric voltage) required by the motor 100.

Here, as a deformed example of the conductive sheet 60 shown in FIGS. 4 and 5, the structure may be formed without the bonding layers 60c. In this case, the conductive layer 60a should be covered by the insulating layers 60b formed by polyester, etc.

FIG. 6 shows the first embodiment, which is a block diagram of the drive circuit 200 for driving the motor 100. The motor 100 is driven by an inverter of PWM (Pulse Width Modulation) system. The drive circuit 200 includes a position detecting circuit 110, a waveform generating circuit 120, a pre-driver circuit 130, and a power circuit 140.

The position detecting circuit 110 detects a magnetic pole of the magnet (the resin magnet 22) of the rotor 20a using a hall IC, etc.

The waveform generating circuit 120 generates a PWM signal for driving the inverter based on a speed instructing signal for instructing a rotating speed of the rotor 20a and a position detecting signal from the position detecting circuit 110 and outputs the PWM signal to the pre-driver circuit 130.

The pre-driver circuit 130 outputs a transistor driving signal for driving the (six) transistors 141 of the power circuit 140.

The power circuit 140 is composed of arms including a DC source inputting part and an inverter outputting part, connecting the respective transistors 141 and the respective diodes 142 in parallel, and further connecting them in series. One side of the DC source inputting part is provided with an electric current detecting circuit (not shown), which outputs an electric current detecting signal.

Since the motor 100 is three-phase, the inverter outputting part with three arms is connected to respective windings. To the DC source inputting part, positive and negative DC power source of 141V, 282V, or 325V obtained by rectifying alternate current of commercial power source, for instance, 100V 200V, or 230V are connected.

When the speed instructing signal is inputted to the drive circuit 200, the waveform generating circuit 120 sets the energizing timing to respective three-phase windings 42 according to the position detecting signal, and in parallel generates and outputs the PWM signal according to the input of the speed instructing signal. The pre-driver circuit 130 which inputs the PWM signal output by the waveform generating circuit 120 drives the transistors 141 in the power circuit 140.

The inverter outputting part applies electric voltage to the winding 42 by driving the transistors 141, the electric current flows through the winding 42, and torque is generated, which causes to rotate the rotor assembly 20. The rotating speed of the motor 100 is set according to the speed instructing signal. The motor 100 is stopped by the speed instructing signal.

Further, the rotor 20a shown in FIG. 1 is formed as one body by combining the permanent magnet (the resin magnet 22) to the shaft 23; it is also possible to form the rotor by arranging the laminated electromagnetic steel plates to the outer circumferential part of the shaft 23, and attaching the ring magnet to the outer circumferential part of the electromagnetic steel plates, or embedding the magnet in the electromagnetic steel plates.

Further, the position detecting circuit 110 shown in the block diagram of the drive circuit 200 of FIG. 6 is an example in which the magnetic pole of the magnet of the rotor 20a is detected by the hall IC, etc.; another method can be applied in which the position of the magnet of the rotor 20a is estimated from the electric current flowing through the DC source inputting part or the inverter outputting part and the output voltage, etc. in the waveform generating circuit 120, or the detection can be done by sensorless drive without using sensors such as the hall IC, etc.

As has been discussed, when driving the motor 100 using the inverter, in order to reduce the noise from the motor 100 accompanied by switching of the transistor 141 within the power circuit 140, the carrier frequency of the inverter is set high. As the carrier frequency is set high, and the DC source inputting part is set high, the electric current tends to flow through the bearings 21a and 21b (the rolling bearings). The electric current flowing through the bearings 21a and 21b (the rolling bearings) generates corrosion, so-called electric corrosion, on the rolling surface of both races of the inner ring and the outer ring, or the rolling element (balls or rollers rolling between the inner and outer rings), degrading the durability of the bearings 21a and 21b (the rolling bearings).

Therefore, in the motor 100 of the present embodiment, the conductive sheet 60 electrically connected to the stator core 41 is inserted between the drive circuit 200 and the bracket 30, the electric current flowing through the bearing 21a flows in the route of the drive circuit 200, the conductive sheet 60, the stator core 41, the winding 42, and the drive circuit 200, and thereby the electric current flowing through the bearing 21a which may cause the electric corrosion can be largely reduced, which is particularly effective to reduce the electric current flowing through the bearing when driving the motor 100 using the inverter.

FIG. 7 shows the first embodiment, which is a perspective view showing an outer appearance of the inverter IC 49a. In the inverter IC 49a, the power circuit 140 and the waveform generating circuit 120 shown in FIG. 6 are embedded in a package 49a-1, leads 49a-3 connected to these circuits are projected outside the package 49a-1, and a radiation fin 49a-2 for releasing the heat of the embedded circuits is provided.

FIG. 8 shows the first embodiment, which is a diagram of a manufacturing process of the motor 100. The following shows the manufacturing process of the motor 100. Either Step 1 or Step 2 can be done first.

(1) Attach the rotor 20a (formed by the resin magnet 22), the bearings 21a and 21b to the shaft 23 and magnetize the resin magnet 22 of the rotor 20a to assemble the rotor assembly 20 (Step 1).

(2) Apply the insulating part 43 to the stator core 41 and apply the winding 42 of concentrated winding to the insulating part 43 to form the stator assembly 40 (Step 2).

(3) Attach the connecting pin 61 to the insulating part 43 of the stator assembly 40 to which the winding 42 is applied. At this time, the connecting pin 61 is arranged so as to contact the stator core 41 (Step 3).

(4) Perform mold forming using mold compound 50 to make the molded stator 10 (Step 4). Here, it is also possible to attach the connecting pin 61 after forming the molded stator 10.

(5) Insert the rotor assembly 20 to the molded stator 10 from the opening part and insert further the rotor assembly 20 until the bearing 21b contacts the bearing supporting part 11 of the molded stator 10 (Step 5).

(6) Insert the printed wiring board 45 to which the drive circuit 200 is mounted and the lead wire 47 is imposed by passing the shaft 23 and the bearing 21a of the rotor assembly 20 through, arrange the printed wiring board 45 at the end part of the opening part side of the molded stator 10 in the axial direction, and connect the winding terminals 44a, 44b, and 44c to the printed wiring board 45 by soldering (Step 6).

(7) Insert the conductive sheet 60 which is almost circular in planar view by passing the shaft 23 and the bearing 21a of the rotor assembly 20 through, and solder the conductive sheet 60 to the connecting pin 61 extended from the stator core 41 in the axial direction (the opening part side of the molded stator 10) (Step 7).

(8) Arrange the radiation member 62 to the inverter IC 49a (Step 8).

(9) Press-fit the metal bracket 30 to the molded stator 10 (Step 9).

As has been discussed, according to the present embodiment, the conductive sheet 60 is arranged between the metal bracket 30 (having conductivity) press-fitted to the molded stator 10 and the printed wiring board 45 mounting the drive circuit 200, thereby reducing the electric current flowing through the bearing 21a, and suppressing the generation of the electric corrosion.

Further, the conductive sheet 60 is electrically connected to the stator core 41, thereby largely reducing the electric current flowing through the bearing 21a, and further suppressing the generation of the electric corrosion.

Further, the conductive sheet 60 arranged between the metal bracket 30 press-fitted to the molded stator 10 and the printed wiring board 45 is connected using the connecting pin 61, thereby reducing the quantity of the connecting member, and facilitating the connection.

Further, the connecting pin 61 is fixed to the insulating part 43, thereby also fixing the connecting position of the conductive sheet 60, and facilitating the connection.

Further, the printed wiring board 45 is provided with the first through-hole 45a having the minimal area for passing the connecting pin 61 through, thereby increasing the usable area of the printed wiring board 45. Limitation of the position to which the connecting pin 61 is arranged is reduced.

Further, since a flexible wiring board is used for the conductive sheet 60, the shape is flexible. Since the flexible wiring board is generally used, it is easily produced and the availability is good. Further, since the flexible wiring board is lightweight, it generates small stress on the soldering used for connecting with the connecting pin 61, thereby improving the reliability.

Further, since the components mounted on the printed wiring board 45 are made to pass through, the heat resistance between the components and the bracket is not increased, and the heat of the components can be released to the bracket 30, thereby reducing the limitation of the mounted components.

Further, the conductive sheet 60 is formed to have almost the same area as the printed wiring board 45, thereby further suppressing the electric current flowing through the bearing 21a.

Further, the drive circuit 200 is driven by the inverter of the PWM system, thereby suppressing the electric current flowing through the bearing 21a synchronized with the switching.

According to the above manufacturing process, when fixing the conductive sheet 60 to the molded stator 10, the arranged connecting pin 61 penetrates the second through-hole 60e, and the conductive sheet 60 is fixed to the connecting pin 61 by only soldering; thus the working process is easy, thereby minimizing the increase of cost of the motor 100.

Further, it is possible to connect by soldering the respective winding terminals 44a, 44b, and 44c to the printed wiring board 45, and the connecting pin 61 to the conductive sheet 60 at the same step using the same soldering, thereby eliminating redundant equipment investment and reducing the manufacturing cost.

As a deformed example of the conductive sheet 60 shown in FIG. 5, the structure may be formed without the bonding layers 60c, in which the conductive layer 60a is covered by the insulating layers 60b formed by polyester, etc., thereby reducing the electric current flowing through the bearing 21a.

When driving the motor 100 using the inverter, in order to reduce the noise of the motor 100, the carrier frequency of the inverter is set high; as the carrier frequency is set high, the axial voltage generated on the shaft 23 of the motor 100 according to the high-frequency induction is increased, the potential difference existing between the inner ring and the outer ring of the rolling bearing which supports the shaft 23 is increased, which makes the electric current to easily flow through the rolling bearing. Therefore, the motor 100 of the present embodiment is particularly effective to reduce the electric current flowing through the rolling bearing when driving the motor 100 using the inverter.

Embodiment 2

Figure 9:
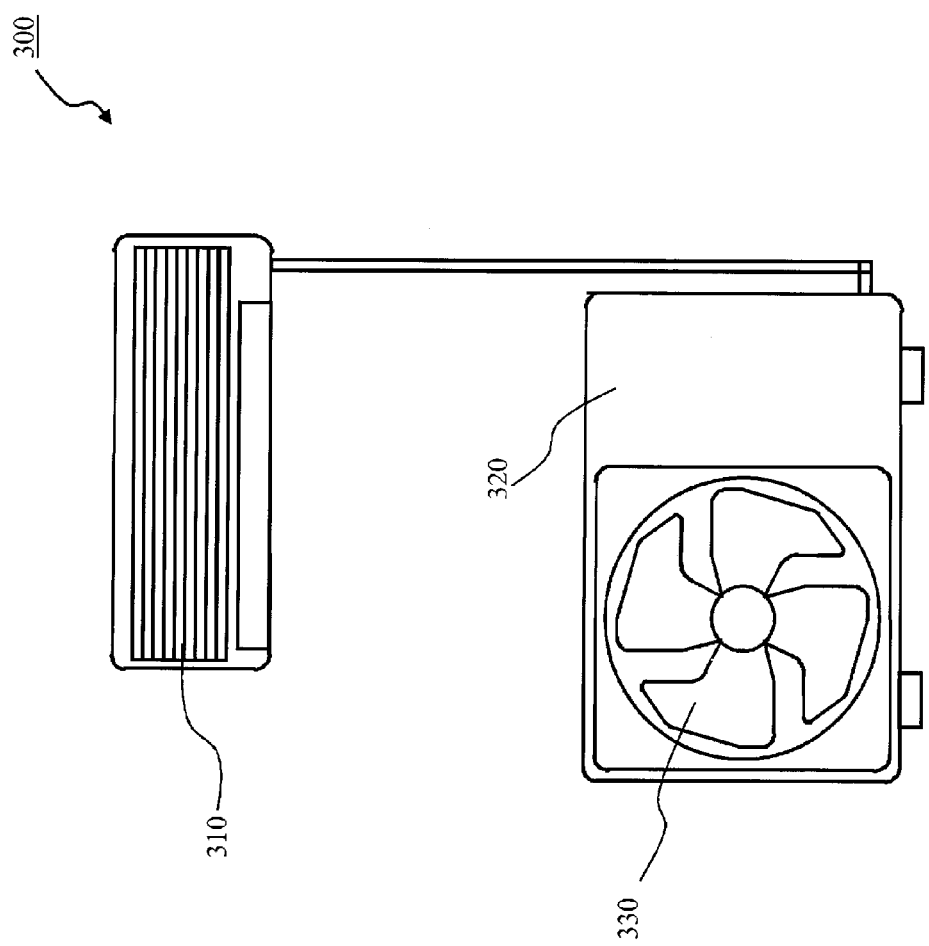
FIG. 9 shows the second embodiment, which is a structure diagram of an air conditioner 300.

FIG. 9 shows the second embodiment, which is a structure diagram of an air conditioner 300.

The air conditioner 300 includes an indoor unit 310 and an outdoor unit 320 connected to the indoor unit 310. An indoor unit blower (not shown) is mounted to the indoor unit 310, and an outdoor unit blower 330 is mounted to the outdoor unit 320.

Then, the outdoor unit blower 330 and the indoor unit blower include the motor 100 of the first embodiment as the driving source.

The motor 100 of the first embodiment is used as the driving source of the outdoor unit blower 330 and the indoor unit blower which are main components of the air conditioner 300, thereby improving the durability of the air conditioner 300.

Here, the motor 100 having the permanent magnet in the rotor 20a has been shown; however, for instance, an induction motor in which the permanent magnet is not used in the rotor 20a can be used.

Further, the motor 100 using the molded stator 10 has been explained; however, the present embodiment can be applied to a motor in which a steel plate frame and a bracket form an outer frame.

INDUSTRIAL APPLICABILITY

As an application example of the motor of the present invention, it is possible to mount the motor and utilize it in electric equipment such as ventilating fans, household electrical appliances, and machine tools.

REFERENCE SIGNS LIST

10: a molded stator; 11: a bearing supporting part; 20: a rotor assembly; 20a: a rotor; 21a: a bearing; 21b: a bearing; 22: a resin magnet; 23: a shaft; 30: a bracket; 30a: a bearing supporting part; 40: a stator assembly; 41: a stator core; 42: a winding; 43: an insulating part; 44a: a winding terminal; 44b: a winding terminal; 44c: a winding terminal; 45: a printed wiring board; 45a: a first through-hole; 45b: a second through-hole; 47: a lead wire, 49a: an inverter IC; 49a-1: a package; 49a-2: a radiation fin; 49a-3: leads; 50: mold compound; 60: a conductive sheet; 60a: a conductive layer; 60b: an insulating layer; 60c: a bonding layer; 60d: a first through-hole, 60e: a second through-hole; 60f: a third through-hole; 60g: a soldering part; 61: a connecting pin; 62: a radiation member; 63: a lead wire fixing component; 100: a motor; 110: a position detecting circuit; 120: a waveform generating circuit; 130: a pre-driver circuit; 140: a power circuit; 141: a transistor; 142: a diode; 200: a drive circuit; 300: an air conditioner; 310: an indoor unit; 320: an outdoor unit; and 330: an outdoor unit blower.

The invention claimed is:

1. A motor comprising:
a stator in which a winding is applied through an insulating part to a stator core formed by laminating a predetermined number of electromagnetic steel plates which have been punched into a predetermined shape;
a rotor assembly in which a rotor and a bearing formed by a rolling bearing is fitted to a shaft;
a printed wiring board which is arranged at an end part of the stator in an axial direction and to which a drive circuit is mounted;
a bracket imposed to at least the end part of the stator in the axial direction to which the printed wiring board is arranged; and
a conductive sheet provided between the printed wiring board and the bracket, wherein the conductive sheet and the printed wiring board are planar structures, and wherein the conductive sheet is parallel to and overlies the printed wiring board.

2. The motor of claim 1, wherein the conductive sheet and the stator core are electrically connected.

3. The motor of claim 2, wherein the conductive sheet and the stator core are electrically connected using a connecting pin which is conductive.

4. The motor of claim 3, wherein the connecting pin is fixed to the insulating part.

5. The motor of claim 3, wherein the printed wiring board is provided with a through-hole for passing the connecting pin through.

6. The motor of claim 1, wherein a flexible wiring board having at least a conductive layer and an insulating layer is used for the conductive sheet.

7. The motor of claim 1, wherein the conductive sheet is provided with a through-hole for passing a component mounted on the printed wiring board through.

8. The motor of claim 1, wherein the conductive sheet has an almost same area as the printed wiring board.

9. The motor of claim 1, wherein the drive circuit comprises at least:
a position detecting circuit for detecting a magnetic pole of the rotor;
a waveform generating circuit for generating a PWM (Pulse Width Modulation) signal to drive an inverter based on a speed instructing signal to instruct a rotating speed of the rotor and a position detecting signal from the position detecting circuit;
a pre-driver circuit for generating a driving signal by an output of the waveform generating circuit; and
a power circuit having an arm for connecting respective transistors and respective diodes in parallel and further connecting them in series.

10. An electric equipment to which the motor of claim 1 is mounted.

11. A method of manufacturing the motor of claim 1, the method comprising steps of:
attaching the rotor and the bearing to the shaft, and magnetizing a magnet of the rotor to form the rotor assembly;
applying the insulating part to the stator core, applying the winding to the insulating part to form a stator assembly, attaching a connecting pin to the insulating part of the stator assembly to form the stator;
inserting the rotor assembly to the stator;
arranging the printed wiring board to which the drive circuit is mounted at the end part of the stator in the axial direction, and connecting a winding terminal and the printed wiring board by soldering;
arranging the conductive sheet outside the printed wiring board in the axial direction; and
press-fitting the bracket to the end part of the stator in the axial direction.

* * * * *